US007263176B2

(12) United States Patent
Cline et al.

(10) Patent No.: US 7,263,176 B2
(45) Date of Patent: *Aug. 28, 2007

(54) DIAGNOSTIC CHECKING OF AN INTER-MESSAGING NETWORK

(75) Inventors: John E. Cline, Lawrenceville, GA (US); Roger K. Ruppert, Kennesaw, GA (US); Joseph H. Myers, Jr., Pelham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 367 days.

This patent is subject to a terminal disclaimer.

(21) Appl. No.: 10/611,206

(22) Filed: Jun. 30, 2003

(65) Prior Publication Data
US 2004/0264658 A1 Dec. 30, 2004

(51) Int. Cl.
*H04M 3/22* (2006.01)
(52) U.S. Cl. ............................... 379/26.02; 379/88.22; 714/40; 707/3
(58) Field of Classification Search ............ 379/10.01, 379/88.22, 10.03, 26.02; 707/3; 714/40
See application file for complete search history.

(56) References Cited

U.S. PATENT DOCUMENTS

| 5,933,475 A | * | 8/1999 | Coleman | 379/10.01 |
| 6,292,909 B1 | * | 9/2001 | Hare | 714/40 |
| 6,850,928 B1 | * | 2/2005 | McClure et al. | 707/3 |

* cited by examiner

*Primary Examiner*—Gerald Gauthier
(74) *Attorney, Agent, or Firm*—Thomas, Kayden, Horstemeyer & Risley, LLP (57) ABSTRACT

One preferred embodiment of the present invention provides a system and method for checking the performance of sub-systems in an inter-messaging network of voice mail systems. This preferred embodiment includes a network diagnostic device that connects to the inter-messaging network and requests a test data file to be retrieved from all the voice mail sub-systems in the inter-messaging network. The requests for the test data file are generated without user interaction. Accordingly, the performance of the inter-messaging network in its entirety, as represented by the results of the request attempts, is assessed according to a defined level of performance, such as a preferred time limit. Other systems and methods are also provided.

56 Claims, 9 Drawing Sheets

Starting namechk.pl at 4/6 4:30  ← 610

VMS54 SubSys:2 172.##.##.67 Spoken Name Not Returned Delay= 46 ← 620

VMS54 SubSys:3 172.##.#.69 Spoken Name Not Returned Delay= 46 ← 630

VMS39 SubSys:2 172.##.#.67 Spoken Name Not Returned Delay= 46

VMS43 SubSys:2 172.##.##.67 Spoken Name Not Returned Delay= 46

VMS75 SubSys:2 172.##.##.67 Spoken Name Not Returned Delay= 46

VMS75 SubSys:3 172.##.##.69 Spoken Name Not Returned Delay= 46

VMS18 SubSys:4 172.##.##.124  Delay= 4

VMS19 SubSys:6 172.##.##.181 Spoken Name Not Returned Delay= 46

VMS20 SubSys:3 172.##.##.228 MBox Not Found Spoken Name Not Returned Delay= 2

VMS97 SubSys:5 172.##.##.73 LDAPSEARCH Died

VMS56 SubSys:1 172.##.##.65  Delay= 7

VMS04 SubSys:5 172.##.###.73  Delay= 7

VMS35 SubSys:6 172.##.###.181 LDAPSEARCH Died

VMS71 SubSys:1 172.##.###.118 Spoken Name Not Returned Delay= 46

FIG. 6

\*\*\*\*\*\*\*\*\*\*\*\*\* SUMMARY \*\*\*\*\*\*\*\*\*\*\*\*\*\*\*\*\*\*\*\*\*

PING FAILURES: 0   ← 710

DELAY OF RETURNED SPOKEN_NAMES 1 sec: Count=42   Percent=20
2 sec: Count=139  Percent=65
3 sec: Count=27   Percent=13
4 sec: Count=1    Percent=1    ← 720
6 sec: Count=0    Percent=0
7 sec: Count=2    Percent=1
8 sec: CNS= 0     Percent=0

TOTAL SPOKEN NAMES RETURNED: 211

LDAP FAILURES - NONAME= 0  NOMBOX= 1   ← 730

Finished namechk.pl at 4/6 6:25   ← 740

FIG. 7

Starting namechk.pl at 4/6 4:30

SYSTEM ID = VMS54   TestMB = 5558880155   NU1_IP = 172.##.#.64   ← 810

Presentation DOMAIN = messagingdmn1

1 VMS54 SubSys:1 172.##.#.64 ALIVE
2 VMS54 SubSys:1 172.##.#.65 ALIVE   ← 820
3 VMS54 SubSys:2 172.##.#.66 ALIVE
4 VMS54 SubSys:2 172.##.#.67 ALIVE
5 VMS54 SubSys:3 172.##.#.68 ALIVE
6 VMS54 SubSys:3 172.##.#.69 ALIVE
7 VMS54 SubSys:4 172.##.#.70 ALIVE   ← 830
8 VMS54 SubSys:4 172.##.#.71 ALIVE

NameQuery for 5558880155 from VMS54 SubSys:1 172.##.#.65
    dn: mailrecipient=+15558880155@messagingdmn1.####.com
    vpimspokenname::vt783M4u8oKY7FPhq/xC4pvtQu+r/FPhq/xS4av8
    Count = 1
    VMS54 SubSys:1 172.17.4.65   Delay= 2   ← 840

NameQuery for 5558880155 from VMS54 SubSys:2 172.##.#.67
    dn: mailrecipient=+15558880155@messagingdmn1.####.com
    VMS54 SubSys:2 172.17.4.67   Spoken Name Not Returned   Delay= 46

NameQuery for 5558880155 from VMS54 SubSys:3 172.##.#.69
    dn: mailrecipient=+15558880155@messagingdmn1.####.com
    VMS54 SubSys:3 172.##.#.69   Spoken Name Not Returned   Delay= 46

NameQuery for 5558880155 from VMS54 SubSys:4 172.##.#.71
    dn: mailrecipient=+15558880155@messagingdmn1.####.com
    vpimspokenname:: vt783M4u8oKY7FPhq/xC4pvtQu+r/FPhq/xS4av8
    Count= 2
    VMS54 SubSys:4 172.##.#.71   Delay= 1

FIG. 8

SYSTEM ID = 30113  TestMB = 5558889437  NU1_IP = 172.##.#.64
Presentation DOMAIN = messagingdmn2
1 30113 SubSys:V 172.##.#.64 ALIVE                    ← 910
2 30113 SubSys:1 172.##.#.65 ALIVE
3 30113 SubSys:2 172.##.#.66 ALIVE NameQuery for 5558889437 from 30113 SubSys:1 172.##.#.64
    dn: mailrecipient=+15558889437@messagingdmn2.####.com
    vpimspokenname:: vt783M4ukaHp39y6rMzs2SHc/+/+yy/bMu2d/OHNz
    Count= 3
    30113 SubSys:1 172.##.#.64 Delay= 2      ← 920

[OMITTED RESULTS]                                     ← 930

*********** SUMMARY *******************

PING FAILURES: 0                                      ← 940

DELAY OF RETURNED SPOKEN_NAMES 1 sec: Count= 42   Percent=19
2 sec: Count= 139  Percent=64
3 sec: Count= 27   Percent=12
4 sec: Count= 2    Percent=1                          ← 950
6 sec: Count= 4    Percent=2
7 sec: Count= 3    Percent=1
8 sec: Count= 0    Percent=0
47 sec: Count= 1   Percent=0

TOTAL SPOKEN NAMES RETURNED: Count= 218

LDAP FAILURES - NONAME= 96  NOMBOX= 7                 ← 960

Finished namechk.pl at 4/6 6:25

FIG. 9

DIAGNOSTIC CHECKING OF AN INTER-MESSAGING NETWORK

CROSS-REFERENCE TO RELATED APPLICATIONS

This application is related to copending U.S utility patent application entitled "Evaluating Performance of a Voice Mail System in an Inter-Messaging Network" filed on the same day as the present application and filed under Express Mail No. EV269334009US, and U.S utility patent application entitled "Evaluating Performance of a Voice Mail Sub-System in an Inter-Messaging Network" filed on the same day as the present application and filed under Express Mail No. EV269333992US, which are both entirely incorporated herein by reference.

TECHNICAL FIELD

The present invention is generally related to messaging systems and, more particularly, is related to the evaluation of messaging systems.

BACKGROUND OF THE INVENTION

Messaging systems constitute a wide variety of technological systems that are provided by numerous different vendors. Accordingly, systems for linking different technological systems have been developed. For example, the voice mail industry adopted the Audio Messaging Interchange Specification (AMIS) standard for exchanging messages between different voice mail systems. AMIS addresses the problem of inter-networking voice mail systems produced by different vendors.

There are two specifications for AMIS. One called AMIS-Analog uses dual tone multi-frequency (DTMF) tones to convey control information in analog transmissions of the voice mail messages. Particularly, in the analog standard, AMIS defines a messaging standard where one voice mail system dials a second voice mail system and plays back DTMF codes from the message header that identifies the target mailbox. Then, the second voice mail system plays back the message to be delivered.

An AMIS-compatible message contains a standard header that includes address information such as the dial-in number of the addressee's voice mail system, the addressee's mailbox number, etc. By recording and storing the received message in the format native to the receiving system, the issue of incompatible message file formats is avoided.

The analog AMIS protocol is simpler and less capable than the second AMIS specification, AMIS-Digital. AMIS-Digital is based on completely digital interaction between two voice messaging systems. Control information and the voice message itself is conveyed between systems in digital form. By contrast, the AMIS-Analog specification calls for the use of DTMF tones to convey control information, and transmission of the message itself is in analog form.

The AMIS-Digital specification is more robust than AMIS-Analog, providing a combination of features from the X.400 messaging recommendation and features commonly available in voice mail systems. For example, it supports features such as inclusion of a message originator's spoken name, and message addressing options such as delivery notification, confidential message, and future delivery.

Building upon the AMIS-Digital standard, Voice Profile for Internet Messaging (VPIM) is a proposed Internet messaging protocol to allow disparate voice mail systems to exchange voice mail over the Internet. VPIM builds on Simple Mail Transfer Protocol (SMTP) and Multi-purpose Internet Message Extensions (MIME) standards. These in turn are built upon the Transport Control Protocol/Internet Protocol (TCP/IP) infrastructures for email interchange to allow standardized exchange of voice and fax messages among servers.

By supporting the AMIS and VPIM standards, for example, today's leading voice mail messaging providers are developing systems that can communicate and interact with systems from other providers. However, with a network involving different messaging technologies provided by different vendors, there is a problem in ensuring that the performance of the network is satisfactory. For example, even though an intended voice mail message may be delivered to its intended recipient, the transmission time to complete the delivery may not be satisfactory. Further, in addition to problems involved with networks of similar technology, diagnosing the source of network transmission problems in a network containing a wide variety of technologies is difficult without a good testing and error detection process. For instance, systematic manual testing of network components is very time consuming and limited.

Thus, a heretofore unaddressed need exists in the industry to address the aforementioned and other deficiencies and inadequacies.

SUMMARY OF THE INVENTION

One preferred embodiment of the present invention provides a system and method for checking the performance of sub-systems in an inter-messaging network of voice mail systems. This preferred embodiment includes a network diagnostic device that connects to the inter-messaging network and requests a test data file to be retrieved from the voice mail sub-systems in the inter-messaging network. The requests for the test data file are generated without user interaction. Accordingly, the performance of the inter-messaging network, preferably in its entirety, as represented by the results of the request attempts, is assessed according to a defined level of performance, such as a preferred time limit.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
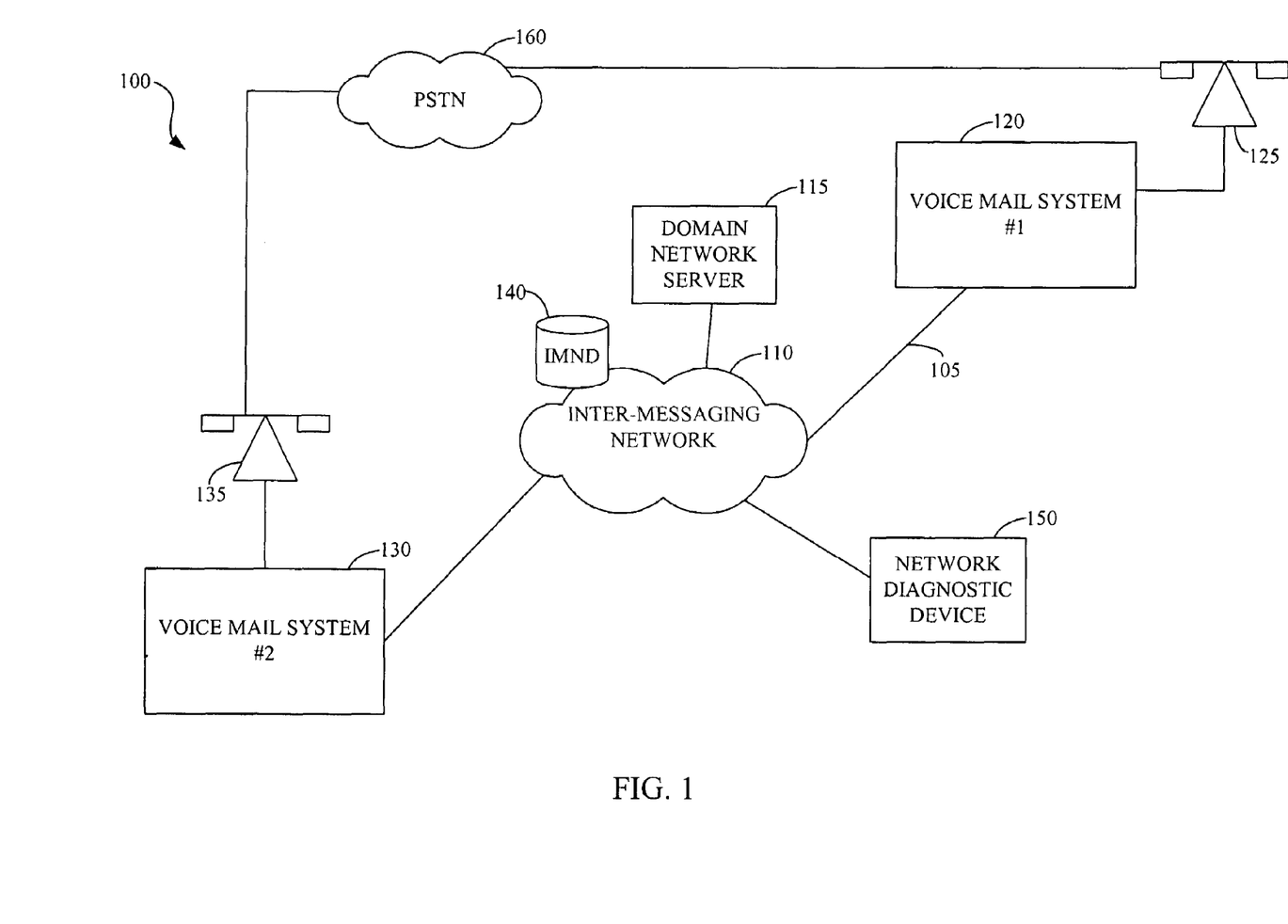
FIG. 1 is a block diagram of an embodiment of a diagnostic communication system 100 of the present invention.

FIG. 1 is a block diagram of an embodiment of a diagnostic communication system 100 of the present invention. The diagnostic communication system 100 includes an inter-messaging network 110. The inter-messaging network 110 is a communication network that enables communication between similar and different voice mail systems or platforms 120, 130. Accordingly, the inter-messaging network 110 ties various voice mail platforms so that they can send messages to each other over a Transport Control Protocol/Internet Protocol (TCP/IP) network. The inter-messaging network 110 and voice mail systems 120, 130, for example, may follow an Audio Messaging Interchange Specification (AMIS) standard or Voice Profile for Internet Messaging (VPIM) standard to facilitate communications between various voice mail systems 120, 130.

Via the inter-messaging network 110, numerous voice mail systems 120, 130 may communicate to one another and forward and receive voice mail messages from one another. Voice mail systems 120, 130 may be from the same vendor and utilize the same technology or may be from different vendors and may utilize different technologies but follow the same messaging protocol(s), such as VPIM and/or AMIS.

An inter-messaging network database IMND 140 maintains information about message mailboxes of users that are hosted by the respective voice mail systems 120, 130. Further, telephone devices 125, 130 are respectively connected to voice mail systems 120, 130. Note, the respective connections from telephone device 135 to voice mail system 130 and telephone device 125 to voice mail system 120 are preferably through PSTN 160 (not shown). (IMND 140 typically contains, among other information, the telephone number of a user's voice mailbox and the identification of the voice mail system 120, 130 that the user's voice mailbox is on. A domain network server (DNS) 115 may be used to aid in the lookup of the Internet protocol (IP) address for the voice mail system 120, 130 based upon the identification information (e.g., a fully qualified domain name (FQDN)) for the voice mail system contained in IMND 140.

The voice mail systems 120, 130 feature the capability to store messages in a variety of audible, data formats required for providing a voice messaging service. These may include such information as spoken name, personal greeting and class of service. A lightweight directory access protocol (LDAP) server, or other online directory service, may be used to aid in the lookup of such information that is associated with a telephone number of a voice mail user. In this particular embodiment, the functionality of an LDAP server is performed by the IMND 140. Under the LDAP standard, an LDAP directory server contains data elements that form a directory tree for the inter-messaging network 110. An LDAP client (such as in a voice mail system 120, 130) connects to the LDAP directory server to obtain a set of information or to request the server to perform an operation. The directory server performs the operation or provides the requested information, if possible.

A network diagnostic device (NDD) 150 is also connected to the inter-messaging network 110 and communicates with voice mail systems 120, 130. The NDD 150 checks the operability of the inter-messaging network 110 as a whole by assessing if all the network interface sub-systems of all the voice mail systems 120, 130 in the inter-messaging network 110 transfer voice mail messages successfully at a desired level of performance. The NDD 150 may be included within a voice mail system 120, 130 or may be separate therefrom and preferably functions as a LDAP client. Also, more than one NDD 150 may be connected to the inter-messaging network 110.

Figure 2:
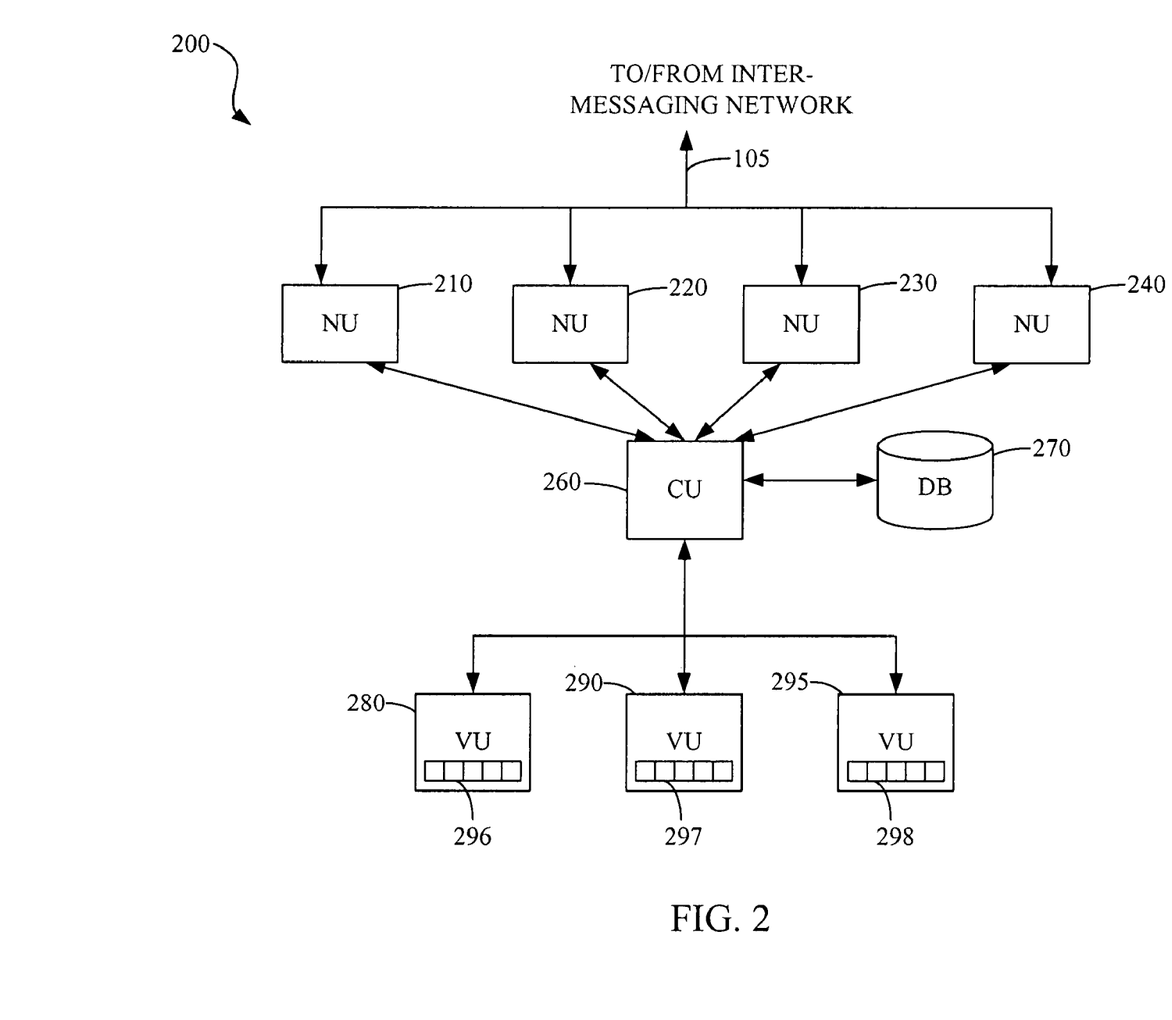
FIG. 2 is a block diagram of an embodiment of one type of voice mail system of FIG. 1.

FIG. 2 shows an embodiment of one type of voice mail system 120 that is representative of a system supplied by many vendors. This particular embodiment 200 of the voice mail system 120 includes network units (NU) 210-240. Each NL is active, commonly grouped in pairs, and communicates with the inter-messaging network 110. Correspondingly, each NU 210-240 communicates with a control unit (CU) 260. The CU 260 of the VMS 120 is a computer type device programmed to manage the operations of the system 120. The CU 260 communicates with a database unit (DB) 270. The DB 270 maintains information corresponding to identifying on which voice processing unit (VU) 280-295 a user's mailbox 296-298 is located.

The respective VU 280 handles playback, generation, and storage of the voice messages for the voice mail mailboxes 296 that it services. Each of the VUs 280-295 is also a computer type device. The VUs 280-295 each include or connect to one or more digital mass storage type memory units (not shown) in which the voice messages are stored. The CU 260 also communicates with VUs 280-295.

The NU 210-240 is a computer type device that acts as an interface between the voice mail system 120, that typically operates on a Unix operating system, and the TCP/IP inter-messaging network 110. There are typically multiple NUs 210-240 per voice mail system 120. The number may vary depending on the number of users of a respective platform, for example. Communication 105 from the inter-messaging network 110 to the VMS 200 is distributed between the plurality of NUs 210-240. Within VMS 200, each NU 210-240 communicates with the CU 260. Accordingly, the CU 260 manages requests from the various NUs to communicate with the various VUs 280-295 within the VMS 200.

For example, consider a request from a voice mail system #2 130 to retrieve a voice recording from a user's voice mailbox contained on voice mail system #1 120, 200, as represented in FIG. 2. The VMS #2 130 sends the request for the spoken name over the inter-messaging network 110 to a respective NU 210 for VMS #1 120, 200. One of the NUs 210-240 receives and processes the request. The processing includes querying the CU 260 for information about the mailbox (e.g., whether the mailbox exist on the platform, whether the mailbox has a recorded spoken name announcement, if so, which VU stores the spoken name announcement, the path/filename where it is stored, etc.). The CU 260 knows some of this information directly, but other items must be retrieved from the DB 270. After the NU gets a response from the CU 260, the NM gets the recorded spoken name announcement directly from the VU and returns it to the remote system that requested it. The communications between NU, CU, and DB are in platform proprietary formats, where LDAP is used between the NU, IMND, and the far end NU.

Figure 3:
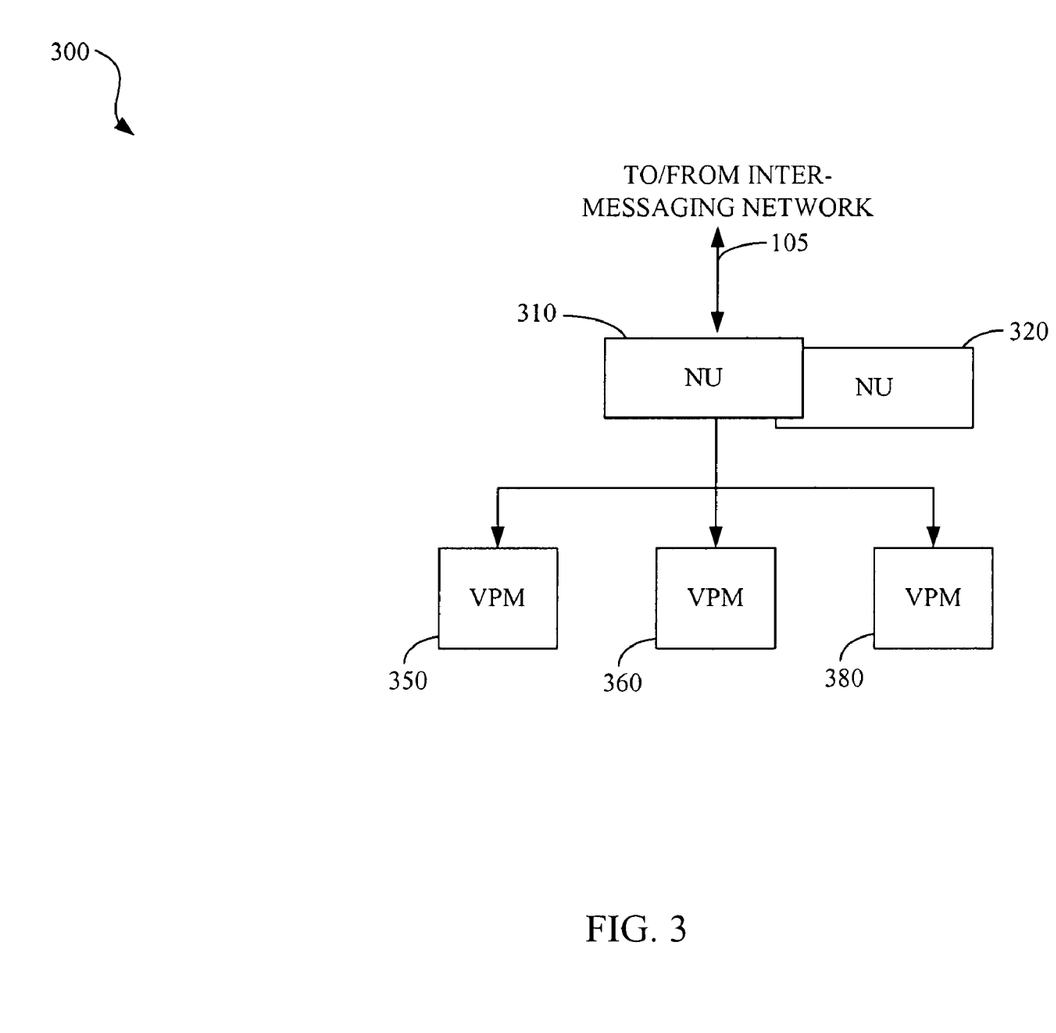
FIG. 3 is a block diagram of an embodiment of one type of voice mail system of FIG. 1.

FIG. 3 shows another representation of a voice mail system 130, 300 that varies from the VMS 120, 200 and may be utilized in the inter-messaging system 110, along with other voice mail systems. Here, the functionality of the CU devices and DB device is combined into a (computer-type) voice processing machine (VPM) 350-380. NU devices 310-320 act as servers for VPMs 350-380 and network 110. NU's 310-320 contain database pertaining to each associated VPM. One NU device is active and the additional NU is provided as a backup for the active NU in case it fails. Network routing information for the VMS 130, 300 is directed to a virtual address for the associated NU pair. Use of the virtual address allows only the active unit to respond to network communication.

Within VMS 300, the active NU communicates with various voice processing machines VPMs 350-380. Accordingly, each VPM 350-380 also contains a database maintaining information corresponding to identifying a user's mailbox 296-298. Communication from the inter-messaging network 110 is directed to a VPM 350-380 via the NU.

For example, consider a request from a voice mail system #1 120 to retrieve a voice recording from a user's mailbox contained on voice mail system #2 130, 300, as represented in FIG. 3. The VMS #1 120 sends the request over the inter-messaging network 110 to the active NU. The active NU receives the request and forwards it to the appropriate VPM 350-380 contained within the system 130, 300. The receiving VPM then retrieves the voice recording for the appropriate user's mailbox. Note, other VMS systems may feature different technological designs than shown in FIGS. 2-3 and are contemplated by the present invention.

Figure 4:
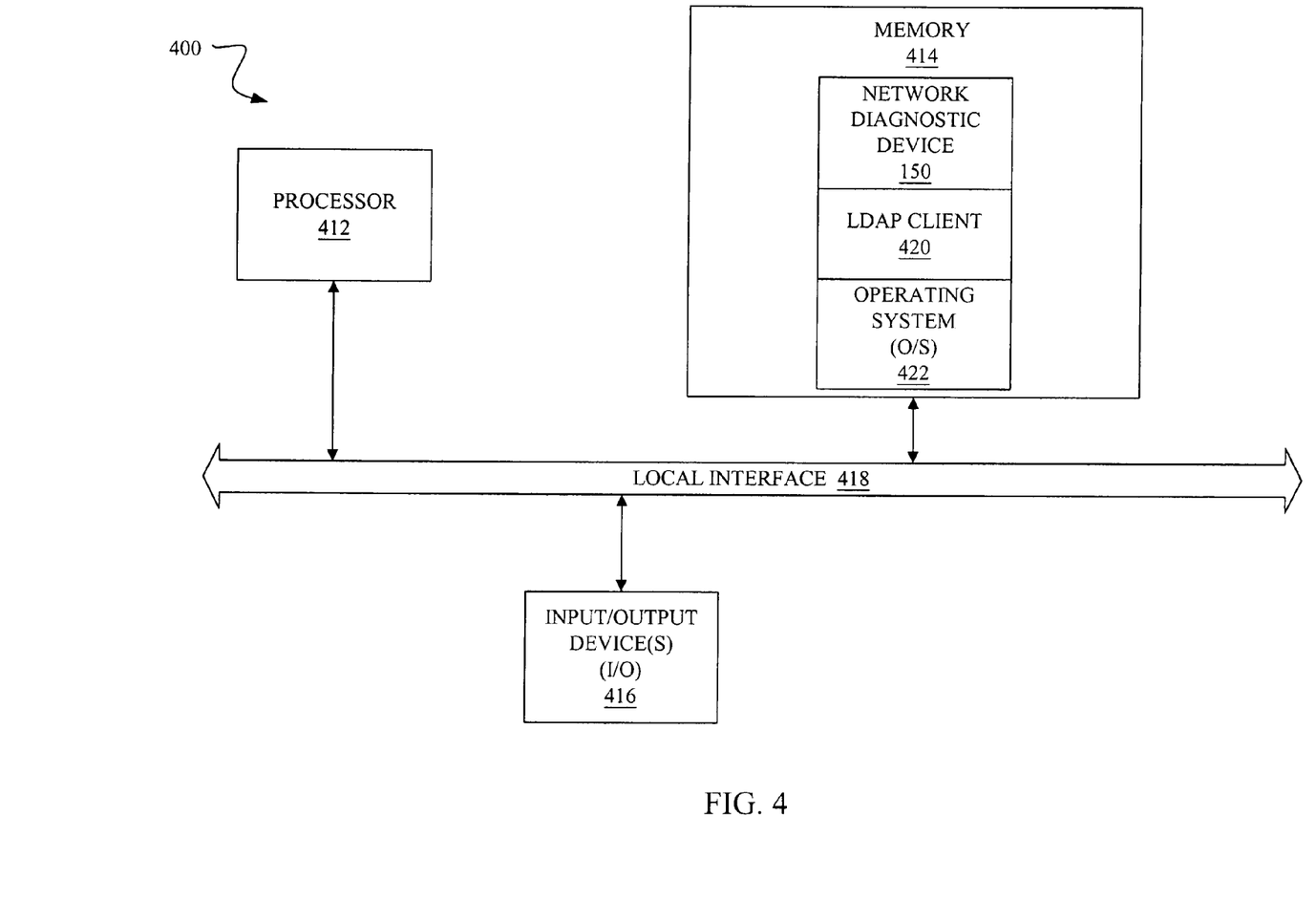
FIG. 4 is a block diagram of an embodiment of a network diagnostic device of FIG. 1.

FIG. 4 shows an embodiment 400 of the NDD 150 as employed in the diagnostic communication system 100. As stated previously, the NDD 150 does not have to (but may) share computing resources with an NU 210-240, 310-320, or other network interface sub-system. The NDD 150 may be a stand-alone computing device that is capable of communicating on the inter-messaging network 110, via the LDAP protocol for example.

The NDD 150 of the invention can be implemented in software (e.g., firmware), hardware, or a combination thereof. In the currently contemplated best mode, the NDD 150 is implemented in software, as an executable program, and is executed by a special or general purpose digital computer, such as a personal computer (PC; IBM-compatible, Apple-compatible, or otherwise), workstation, minicomputer, or mainframe computer. An example of a general-purpose computer that can implement the NDD 150 of the present invention is shown in FIG. 4. In FIG. 4, the NDD 150 is denoted by reference numeral 150.

Generally, in terms of hardware architecture, as shown in FIG. 4, the computer 400 includes a processor 412, memory 414, and one or more input and/or output (I/O) devices 416 (or peripherals) that are communicatively coupled via a local interface 418. The local interface 418 can be, for example but not limited to, one or more buses or other wired or wireless connections, as is known in the art. The local interface 418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 412 is a hardware device for executing software, particularly that stored in memory 414. The processor 412 can be any custom made or commercially available processor, a central processing unit (CPU), an auxiliary processor among several processors associated with the computer 400, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 414 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 414 may incorporate electronic, magnetic, optical, and/or other types of storage media. Note that the memory 414 can have a distributed architecture, where various components are situated remote from one another, but can be accessed by the processor 412.

The software in memory 414 may include one or more separate programs, each of which comprises an ordered listing of executable instructions for implementing logical functions. In the example of FIG. 4, the software in the memory 414 includes the NDD 150 in accordance with the present invention, a LDAP client 420, and a suitable operating system (O/S) 422. A nonexhaustive list of examples of suitable commercially available operating systems 422 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 422 essentially controls the execution of other computer programs, such as the NDD 150, and provides scheduling, input-output control, file and data management, memory management, and communication control and related services.

The NDD 150 may be a source program, executable program (object code), script, or any other entity comprising a set of instructions to be performed. When a source program, then the program needs to be translated via a compiler, assembler, interpreter, or the like, which may or may not be included within the memory 414, so as to operate properly in connection with the O/S 422. Furthermore, the NDD 150 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the NDD 150 is written as computer code using the Perl programming language.

The I/O devices 416 may include input devices, for example but not limited to, a keyboard, mouse, scanner, microphone, etc. Furthermore, the I/O devices 416 may also include output devices, for example but not limited to, a printer, display, etc. Finally, the I/O devices 416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 400 is a PC, workstation, or the like, the software in the memory 414 may further include a basic input output system (BIOS) (omitted for simplicity). The BIOS is a set of essential software routines that initialize and test hardware at startup, start the O/S 422, and support the transfer of data among the hardware devices. The BIOS is stored in ROM so that the BIOS can be executed when the computer 400 is activated.

When the computer 400 is in operation, the processor 412 is configured to execute software stored within the memory 414, to communicate data to and from the memory 414, and to generally control operations of the computer 400 pursuant to the software. The NDD 150 and the O/S 422, in whole or in part, but typically the latter, are read by the processor 412, perhaps buffered within the processor 412, and then executed.

Figure 5:
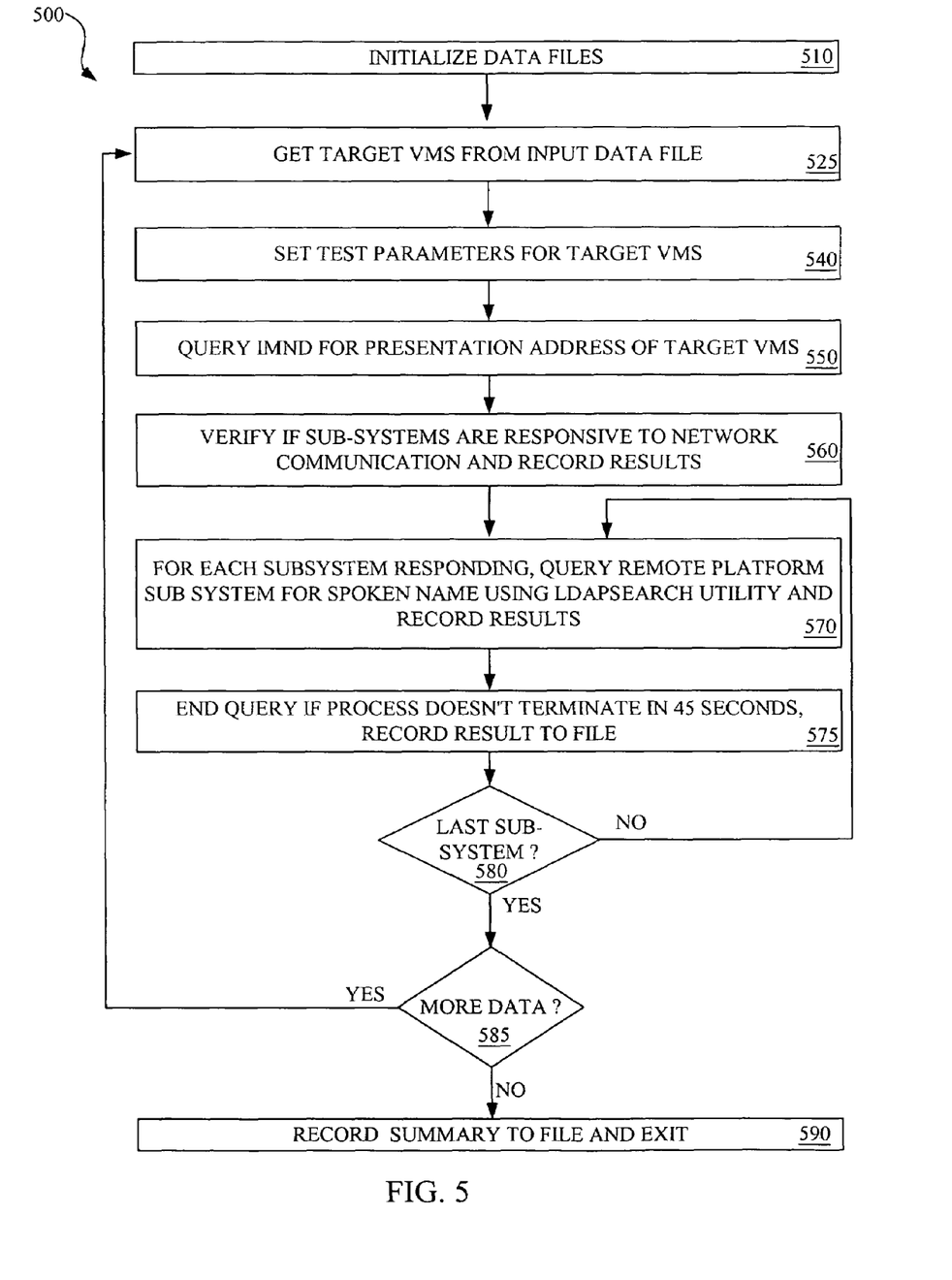
FIG. 5 is a flowchart illustrating the functionality 500 of one embodiment of the network diagnostic device of FIG. 4.

When the NDD 150 is implemented in software, as is shown in FIG. 5 hereafter, it should be noted that the NDD 150 can be stored on any computer readable medium for use by or in connection with any computer related system or method. For example, the NDD 150 may be detailed in a computer program or script that runs on a voice mail system or a stand-alone server. In operation of the script, the NDD 150 simulates a request to a remote voice mail system and particular network interface sub-system(s) and for a specific mailbox number. Note, the operation of the NDD 150 is intended to be launched and run in the background of a computer, since the necessary input information is typically configured to be obtained from data files. For example, the test mailbox for a respective voice mail system may be determined by entries in a data file.

In the context of this document, a computer readable medium is an electronic, magnetic, optical, or other physical device or means that can contain or store a computer program for use by or in connection with a computer related system or method. The NDD 150 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, or communicate, the program for use by or in connection with the instruction execution system, apparatus, or device. The computer readable medium can be, for example but not limited to, an electronic, magnetic, optical, electro-magnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the NDD 150 is implemented in hardware, the NDD 150 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Referring again to FIG. 1, the general operation of the inter-messaging system 110 will now be described. Consider the following common scenario: a first user logs into his voice mail system and decides to send a voice mail message to a second user of a different voice mail system. The first user enters the mailbox number of the second user, and then hears a recording (generated during setup of the second user's voice mail system) by the second user of the second user's voice saying the second user's name over the telephone PSTN network 160 or a wireless network (not shown). This announcement of a user's name is typically referred to as a "spoken name" and is stored and played back from the user's voice mail system 130.

All the prompts the first user hears to generate a voice message or play back a voice messsage from another user are provided by the first user's local voice mail system 120. The only audio response provided by a remote voice mail system of another user is the user's spoken name. Typically, a local voice mail system 120 has a limited time frame in which it will wait to receive the spoken name from a remote voice mail system 130. If the spoken name is not received within that time frame (e.g., 3 to 5 seconds), the local voice mail system will typically announce the digits of the other party's phone number in lieu of the spoken name.

The first user may then leave a voice message by generating a voice recording on his or her local voice mail system 120. The local voice mail system 120 sends the recording via TCP/IP over the inter-messaging network 110 to the remote VMS 130. Then, the local voice mail system 120 announces a confirmation that the message was sent.

When the second user listens to the voice message, the voice mail system 130 of the second user may check or query the inter-messaging network database (IMND) 140 to see if the originator (first user) of the voice message is contained in the IMND 140. If the originator of the voice message is contained in the IMND 140, then at the end of the playback of the voice message, the second user's local voice mail system 130 provides the second user the option of generating a reply to the originator (first user). The reply, if made, will be sent to the Internet address of the remote voice mail system 120 registered with the originator (first user) in the IMND 140.

Alternatively, consider the scenario where the second user may check to see if there are any messages for the second user in the second user's mailbox (stored on a VU) on the local VMS. Therefore, the second user can log into his or her mailbox on a VU within his or her local VMS 130 and listens to any messages that have been left for the party. During the time that the second user is listening to the message, the second user's local VMS 130 checks to see if it can reply to the message by sending queries to the IMND 140 in the inter-messaging network 110. The queries check to see if the telephone number (of the first user) that sent the message being played is in the IMND 140. If so, the IMND 140 returns the Internet address of the remote VMS 120 that the sender (first user) resides on.

The local VMS 130, upon receiving the Internet address of the sender's voice mail system 120, requests the spoken name for the sender from the remote voice mail system 120 and receives it, preferably, within the stated time limit for that local system 120 which may be 3 to 5 seconds, for example. After the message has finished playing, the VMS 130 for the second user will then play the spoken name and prompts the second user to generate a reply by pressing a particular key on the second users telephone 135, for example. From these scenarios, it is shown that at retrieval of a spoken name is an integral component of modem voice mail communication.

To assess the performance of the inter-messaging network 110, the NDD 150 of the diagnostic communication system 100 keys on the fact that the retrieval of the spoken name from another voice mail system 130 is an important indicator of how the inter-messaging network 110 is performing in its entirety. For instance, if a VMS 120 can request a spoken name for a particular mailbox in a different VMS 130 and receive that spoken name in 3 to 5 seconds, then the inter-messaging network 110 can generally be assumed to be working satisfactorily. However, if a spoken name is not received within an acceptable time, then that is symptomatic of a possible technical defect in the inter-messaging network 110.

Specifically, by requesting and retrieving the spoken name, the functionality that is employed in sending a regular voice message can be tested in the inter-messaging network 110. For example, functions such as checking whether a user's mailbox or telephone number is in the IMND 140 and whether the Internet address (e.g., FQDN) of the user's VMS 130 is in the IMND 140 are analyzed. Further, the functionality of system components and connections are tested in and between two voice mail systems 120, 130 in communication, including routing and switching capabilities of the inter-messaging network 110. Accordingly, the retrieval of the spoken name is a valuable indicator of how the inter-messaging network 110 is working.

FIG. 5 depicts the functionality 500 of a preferred implementation of the NDD 150. It should be noted that, in some alternative implementations, the functions noted in the various blocks may occur out of the order depicted in this figure and subsequent figures. For example, two blocks in succession in a figure may, in fact, be executed substantially concurrently or the blocks may be executed in reverse order depending upon the functionality involved.

Referring now to the flowchart of FIG. 5, the present invention includes a process 500 for diagnostically checking the operation of the inter-messaging network 110. The process 500 involves initializing data files that contain or are to contain input and output data, as shown in block 510. For example, an input data file may be stored in a database that is accessible by the NDD 150. This input data file then may contain information about all the VMS systems and sub-systems contained in the inter-messaging network that is retrieved by the NDD 150 to carry out certain operations. Further note, NDD 150 may be residing in a local VMS system, or in other alternative embodiments, the NDD 150 may be standalone device connected to the inter-messaging network 110 and not residing within a VMS system.

As shown in block 525, information identifying a target VMS is retrieved from the input data file so that the operations of the particular VMS may be assessed. Then, test parameters are set up according to this information for the target VMS. Test parameters may typically include a predefined test mailbox number located in the target VMS that the test data file (e.g., spoken name file) is attempted to be retrieved from, the number of network interface subsystems (e.g., NU 210-240, 310-320) located in the particular target VMS, the Internet addresses for the network interface subsystems, the type of test data file to retrieve, etc.

After the test mailbox number has been determined for the target VMS, the IMND 140 is queried for the presentation address of the targeted VMS, as indicated in block 550. The presentation address is the Internet domain address for the target VMS that communication, such as spoken name queries, may be addressed to. Before such communication is sent however, each active network interface sub-system (e.g., NU 210-140, 310-320) of the target VMS is tested to verify that each respective sub-system is responsive to network communications, as shown in block 560. Typically, this step is performed using a Packet Internet Grouper (PING) program or command to ensure that each of the network interface sub-systems is operating and is accessible on the inter-messaging network 110.

Since part of the function of the process 500 is to determine how many network interface sub-systems are featured in a particular target voice mail system, the process may involve accessing an input data file in a database (not shown) that contains this information for every voice mail system in the inter-messaging network 110. The results of the verification procedure may then be recorded in an output data file containing these results (and other output results from this diagnostic process 500).

Consider, in some voice mail systems, each network interface sub-system (e.g., NU 210-240) is assigned more than one Internet address so that the sub-system may perform different services or operations (e.g., send and receive operations) simultaneously on several Internet addresses. Therefore, for such a system, the NDD 150 may execute the PING command (or "ping" ) for each Internet address that is assigned to a respective sub-system. Although a network interface sub-system may have more than one Internet address, if each Internet address responded successfully to the PING command, communication intended for a particular network interface sub-system will be addressed to only one of the Internet addresses for that particular sub-system. Accordingly, the NDD 150 may arbitrarily select the Internet (IP) address that has the largest numerical order and also responded successfully to the PING command.

Therefore, for each network interface sub-system that is verified to be responsive to network communication, a test data file is requested from the specified network interface sub-system(s) for the target VMS. In this particular embodiment, a spoken name file is the type of test data file that is requested, as shown in block 570. In preferred embodiments, the spoken name query is performed using a Lightweight Directory Access Protocol (LDAP) search utility ("ldapsearch") supported by the NDD 150 and the inter-messaging network 110.

LDAP is a widely accepted, standard that allows client applications to access directory information over the inter-messaging network 110. LDAP is supported by most vendors of voice mail systems and is consistent with the X.500 directory model. Since many voice mail systems utilize LDAP protocol, the NDD 150 can run off of a voice mail system and check if the voice mail system is able to communicate successfully with other voice mail systems.

LDAP directory services can be provided within voice message systems that are LDAP capable, for example, or on a standalone LDAP server. Under the LDAP directory structure, clients can access directory information, such as the spoken name, via a telephone number. Note, LDAP voice messages are made up of one or more parts, at least one of which must be voice message and may be MIME encoded. The VPIM profile allows for optional, additional MIME parts for spoken name, forwarded messages and fax messages, and an electronic business card data definition, that allows automatic updating of directory information with phone number, text name or email address.

For example with LDAP, voice mail systems can read or update the IMND 140 which also recognizes the LDAP protocol. For instance, after creating a voice mail message by phone or forwarding a message to another recipient, the user can address the message by entering the recipient's phone number. Then, the local VMS 120 may make a LDAP query over the inter-messaging network 110 to the IMND 140 requesting for the identity (e.g., FQDN) of the voice mail system hosting the mailbox of the recipient. Then, the local VMS requests and receives an IP address listed in the DNS 115 for a network interface sub-system of that voice mail system identity. Accordingly, the local VMS sends a LDAP query to this network interface sub-system asking for specific attribute information, such as a spoken name, associated with the mailbox number of the recipient. The remote VMS 130 might then return the requested spoken name attribute from the remote VMS 130 to the local VMS 120. When the user on the local VMS 120 hears and confirms the spoken name, it validates that the mailbox address of the recipient is correct. The local VMS 120 may then send the message.

Therefore, by using an LDAP search utility, the NDD 150 can query the IMND 140 to obtain the identity of the VMS 120, 130 which hosts the recipient's voice mailbox. To do so, the NDD 150 provides the necessary information to complete the search such as a mailbox number, or telephone number, and the test data items that are being requested, such as a spoken name or, in alternative embodiments, a specific voice message. Then, the NDD 150 utilizes a LDAP client to initiate and complete the request under LDAP protocol. If the task is completed and the test data item or file is successfully retrieved. This can be indicated by the tags embedded in the LDAP message identifying the data file that is returned to the NDD 150.

At this time or a later time, such as shown in step 590, results from the spoken name query may be recorded. For example, textual representations of the spoken name data file may be saved to verify its successful retrieval. Also, results typically include the amount of time that elapsed ("delay time") between the initiation of the request for the spoken name and its successful retrieval or termination. Results also may include any errors that occur during the querying process. For example, if a spoken name query is not completed after a defined amount of time, such as 45 seconds, then query may be ended, as shown in block 575, and the unsuccessful query attempt is made of record.

Correspondingly, once all verified network interface sub-systems has been tested for the target VMS, a new VMS is established as the target VMS and the process starts over, as shown by blocks 580-585. After all the VMS systems in the input date file have been evaluated, then a summary of the results are recorded and the process ends, as shown in block 590. There may be more be a wide variety of output reports or files generated according to a user's preferences or needs. For example, a log of all the test results for each network interface sub-system may be generated or an output log of only the test results that did not meet a desired level of performance may be compiled, among others.

Figure 6:
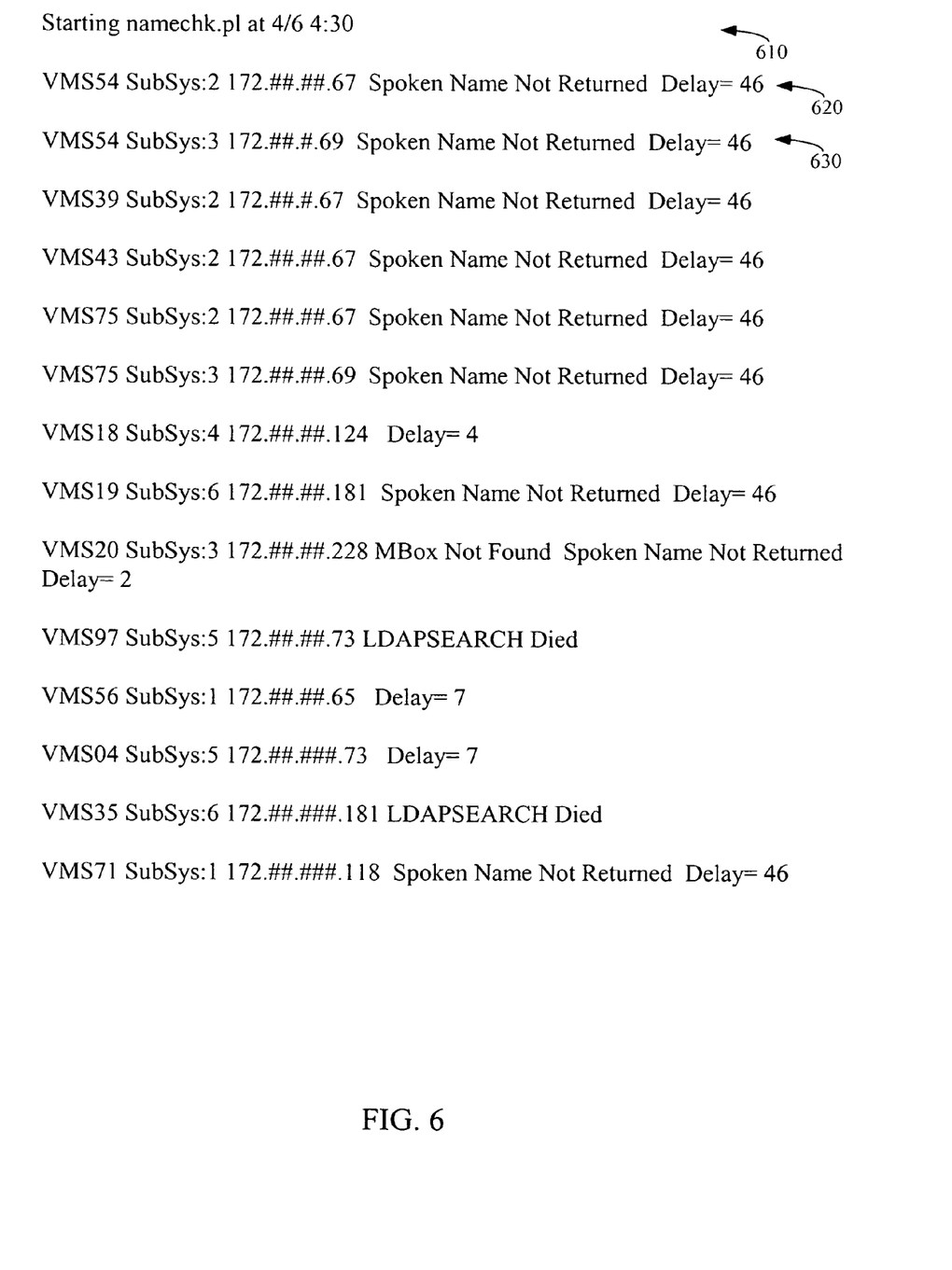
FIG. 6 is a representation of a portion of an error output report generated by one embodiment of the network diagnostic device of FIG. 4.

FIGS. 6-9 display portions of one embodiment of screen shots of output reports generated for one implementation of the network diagnostic device 150. In FIG. 6, an example of one embodiment of the output report of the NDD 150 is shown. For this example, an output data file is generated that records the instances of errors or other difficulties regarding spoken name queries. As can be seen by pointer 610, the time and date ("⅘4:30") the NDD 150 was executed was also recorded. Also, of note, is that the NDD 150 for this example was performed using a Perl program entitled "namecheck.pl," as shown by indicator 610.

Further, as indicated by pointer 620, the output information indicates that a voice mail system with the identifier "VMS54" did not have a spoken name file returned when a spoken name query was sent to its second network interface sub-system (having an Internet address ending in "67"). In particular, the spoken name query was ended by the NDD 150 after 46 seconds had passed without a response, in accordance with block 575. Also, for this particular VMS, its third sub-system ("ending in 69") also did not return a spoken name after 46 seconds.

Correspondingly, the rest of the output results of FIG. 6 also indicate other error messages that were generated and recorded for other systems and sub-systems, according to blocks 570-575.

Figure 7:
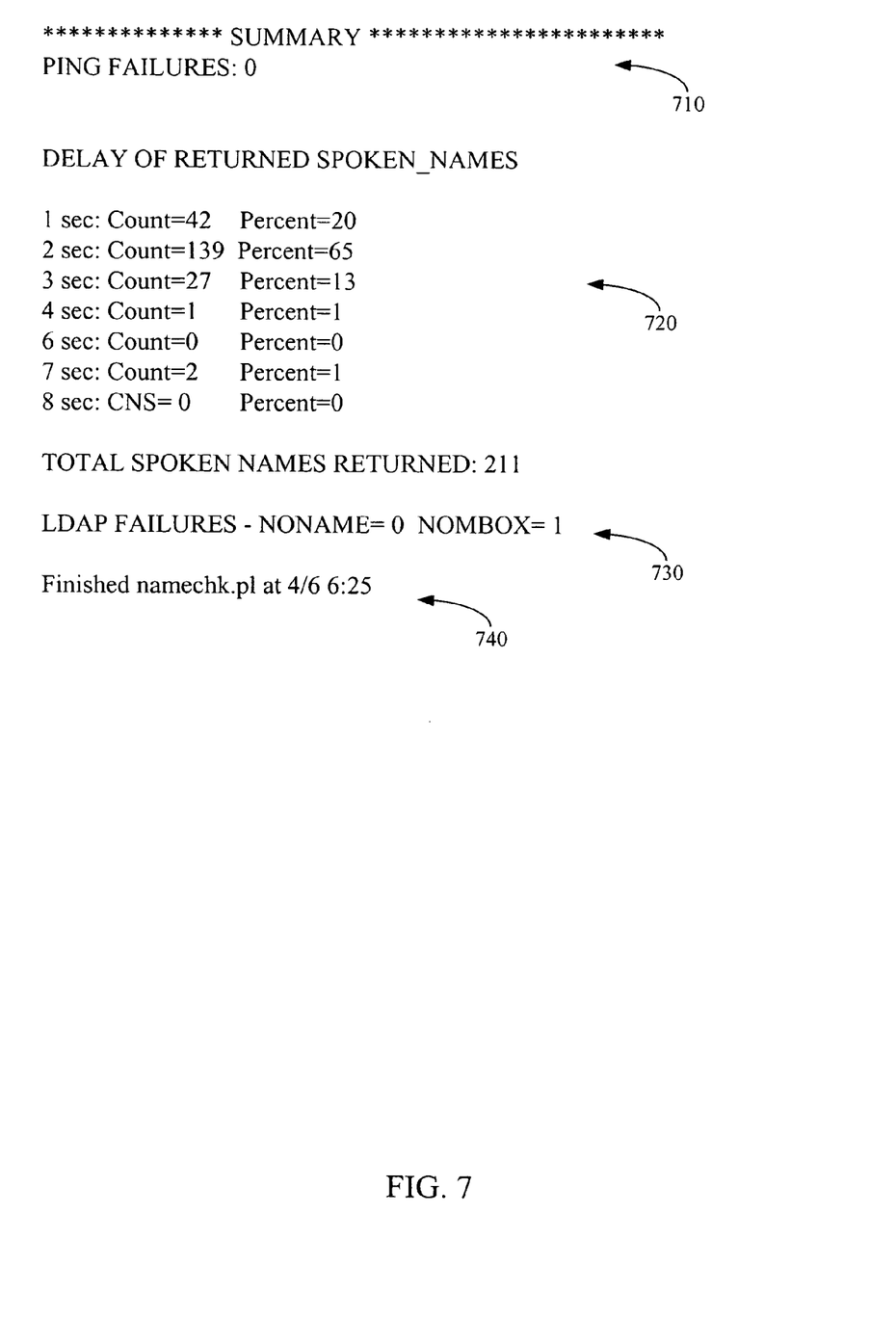
FIG. 7 is a representation of a portion of the error output report generated by one embodiment of the network diagnostic device of FIG. 4.

Likewise, FIG. 7 is a continuation of the output results of FIG. 6 for this particular embodiment. It displays a summary of the error results that have been compiled and recorded. For instance, the number of failures of a PING verification procedure are shown, as indicated by pointer 710. Also, a breakdown of the delays in retrieving spoken names are shown along with a percentage for each, as indicated by pointer 720. Other information may be included such as a count of spoken name queries that were unable to be processed may also be shown along with the time at which the process was completed, as indicated by pointers 730 and 740.

Figure 8:
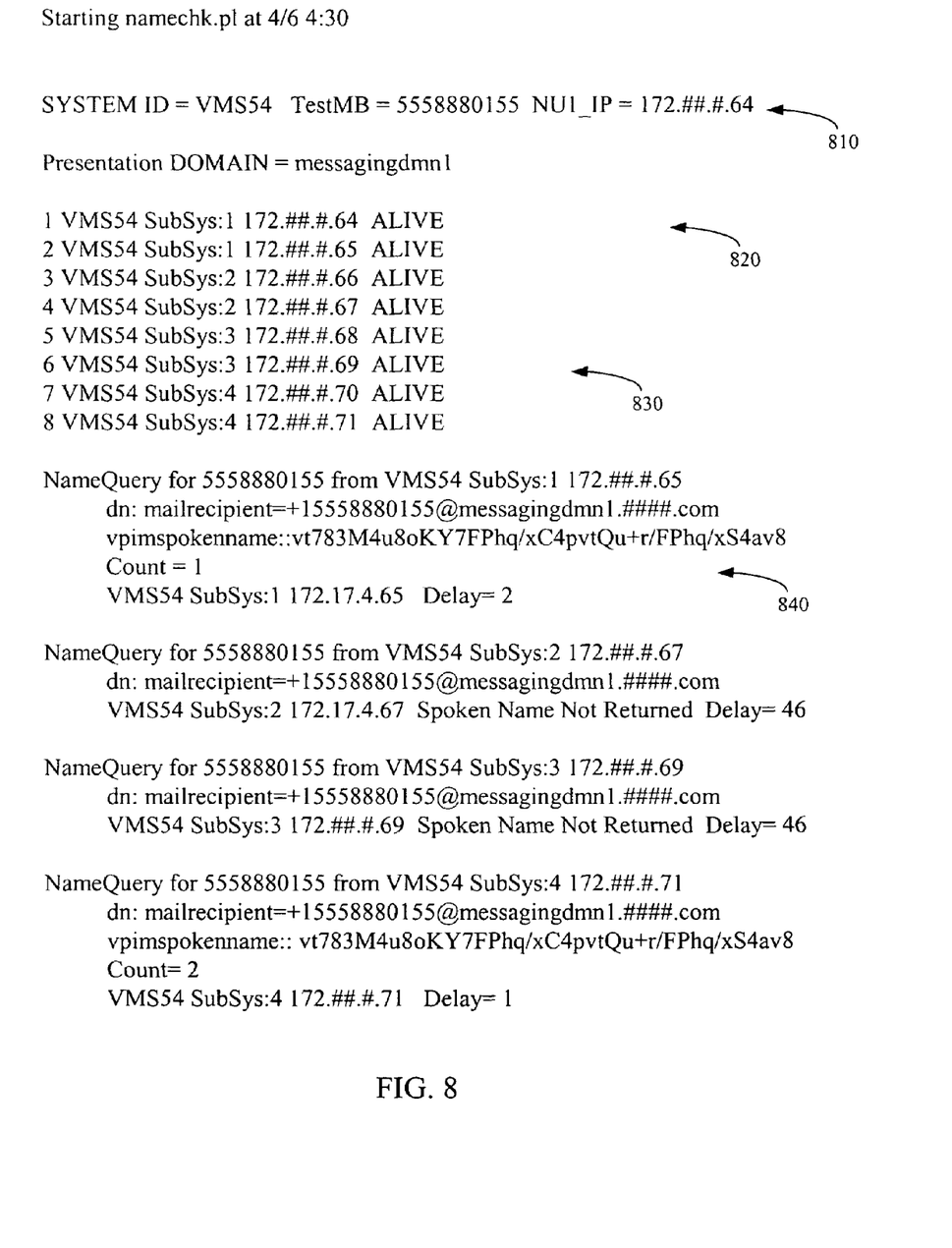
FIG. 8 is a representation of a portion of a comprehensive output report generated by one embodiment of the network diagnostic device of FIG. 4.

As stated earlier, it may also be desirable to compile a comprehensive list of the results for every sub-system of every voice mail system that was checked in the inter-messaging network 10, regardless if an error was produced. Accordingly, FIG. 8 represents a portion of one example for one embodiment of such a comprehensive output report. As indicated by pointer 810, the first voice mail system tested is identified, in this output report, as "VMS54," as indicated by pointer 820. The specific test mailbox for this VMS is shown to be "5558880155," and the presentation domain for "VMS54" is "messagingdmn 1."

Next, the results of a PING procedure are shown for each of the Internet addresses of the four sub-systems for system "VMS54," as indicated by pointer 830. Here, "VMS54" is assumed to be of the type of voice mail system 200 of FIG. 2, for this example. The output reports indicate that each Internet address responded and was shown to be "ALIVE" and responsive to network communications. Then, in accordance with block 570 and as indicated by pointer 840, the first sub-system was queried to retrieve the spoken name from the test mailbox. As shown, the spoken name was retrieved successful in a time ("delay") of 2 seconds, and a part of the data retrieved by the spoken name query is displayed. Further, a count ("Count=1") for the number of successful spoken name retrievals is also displayed. In accordance with block blocks 575 and 580, results for the spoken name queries for the other sub-systems follows, as indicated. For these results, the count of the total successful retrievals is incremented for each successive retrieval of the spoken name file.

Figure 9:
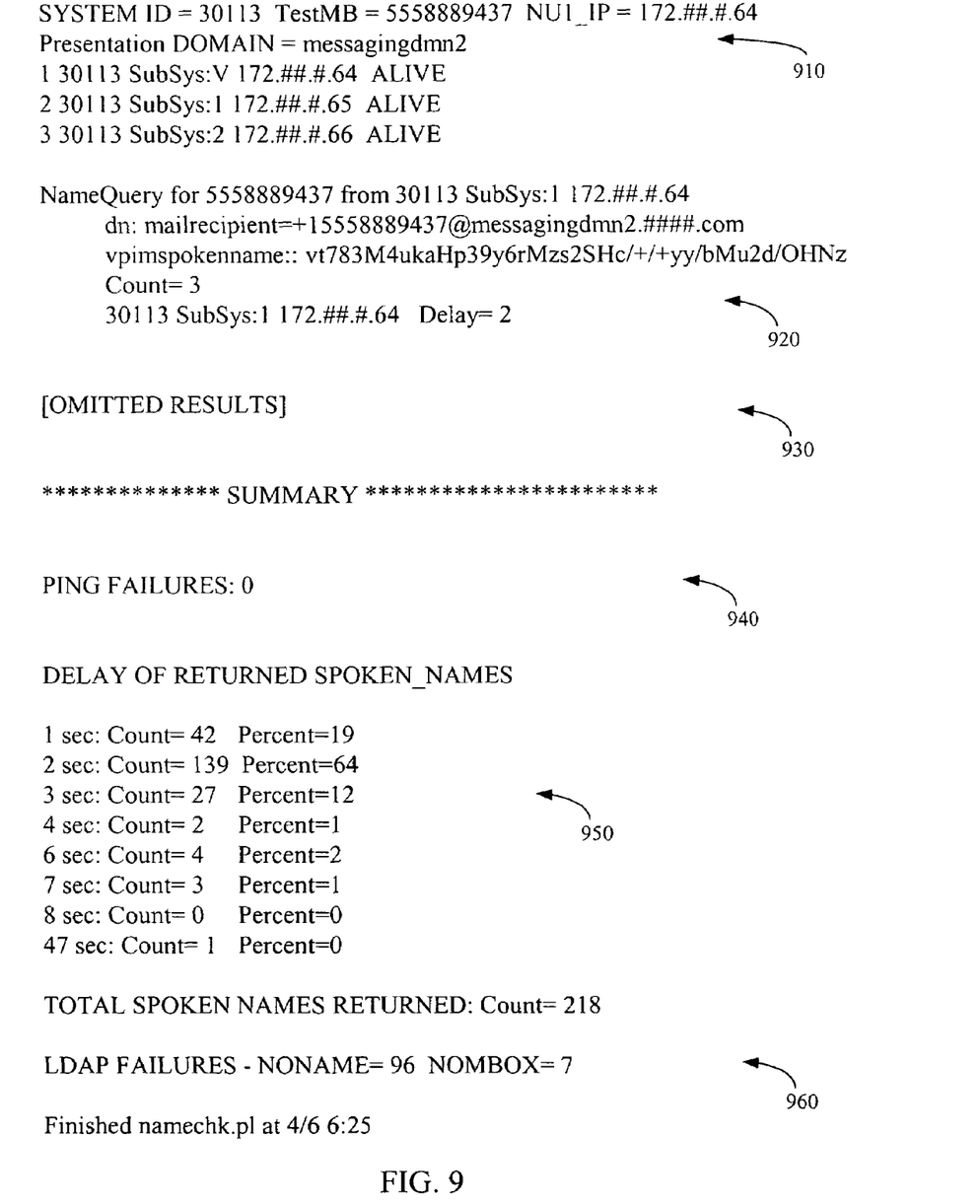
FIG. 9 is a representation of a portion of the comprehensive output report generated by one embodiment of the name query device of FIG. 4.

Referring now to FIG. 9, a continuation of the output results of FIG. 8 is shown. As stated previously, it may be assumed that the prior voice mail system ("VMS54") evaluated in FIG. 8 was of the type of FIG. 2. However, NDD 150 can also evaluate other voice mail systems, such as the type of FIG. 3, as indicated by pointer 910. Thus, the VMS system "30113" identified in FIG. 9 may be assumed to be a system 300 of the type shown in FIG. 3. As previously explained, this type of VMS 300 has one active network interface sub-system (e.g., NU 310-330), where another sub-system 320 is available as a back up to the active network interface sub-system 310 in case the active sub-system 310 fails.

As indicated by pointer 910, the VMS system tested is shown in the output report to have the identifier "30113," a test mailbox with the number "5558889437," and the presentation address of "messagingdmn2." Also, as indicated by pointer 910, the active Internet addresses (IPs) on the remote system 120, 130 include a virtual Internet address (ending in "64") that points to the active network interface subsystem. Note, the actual physical Internet addresses for this sub-system are also shown. Specifically, the active subsystem has two physical Internet addresses ending in "65" and "66." For this example, all of the sub-systems (both virtual and physical) for "30113" are "ALIVE" and responded successfully to the verification process, in accordance with block 560, as shown by pointer 920. Then, as represented by pointers 920 and 930, the "virtual" sub-system of "30013" is queried to retrieve a spoken name file from the test mail box at the virtual Internet address which maps to one of the physical Internet addresses.

Note, results for each sub-system of each VMS will be generated in the output file for this particular embodiment. (In consideration of brevity, FIG. 9 does not show all of the results that would be expected for this particular embodiment, as indicated by pointer 930.) After all the sub-systems of the inter-messaging network have been checked, a summary of the results may be compiled and recorded, as indicated by pointer 940. Here, it is shown that there were not any sub-systems that did not respond to the verification (e.g., PING command) procedures. Also, a breakdown of the delays incurred in retrieving the spoken name is shown along with a percentage value assigned to each. For example, 12 percent of the spoken name files were retrieved in 3 seconds, as indicated by pointer 950. Another interesting value shown in the summary is the final count for the total spoken names returned, as indicated.

For spoken name queries that were unable to be processed, a sum of the particular failures that occurred are also recorded, as shown by pointer 960. For this particular example, there were 96 instances where the spoken name file was reported to not have been found at the test mailbox. Further, there were 7 instances where the test mailbox was not located. Additionally, at the end of the output file, the time and date that the NDD process was completed may also be saved, as indicated.

The functionality 500 of the NDD 150 allows a technician to assess comprehensively and automatically the performance of all the sub-systems of all the voice mail systems 120, 130 in an inter-messaging network 110 by diagnostically checking each voice mail sub-system and displaying the results of the examination. Specifically, for one preferred embodiment of the invention, a primary purpose of the diagnostic communication system 100 is to query a spoken name file from every network interface sub-system (e.g., NU 210-240, 310-320) listed in a data file for an inter-messaging network 110. To do so, a network diagnostic device runs or operates without user interaction, always using a default test mailbox to request the spoken name file. When run at low usage periods on the inter-messaging network, the diagnostic communication system 100 may show the best possible performance available from the inter-messaging network 110. Alternatively, when run at normal or high traffic periods, the results produced by the NDD 150 may reflect the performance impacted by user traffic and load. All of which are useful and beneficial to technicians or operators who manage and maintain the inter-messaging network 110.

Otherwise, testing of communication capabilities between different voice mail systems and sub-systems generally requires technicians to manually test the systems which is very time consuming and labor intensive. Further, manual testing is not necessarily a good indicator of how well a network is performing in its entirety. For example, the voice mail system 200 of FIG. 2 features redundant NUs 210-240 that may receive the spoken name request. IF there are several NUs that are not functioning properly, the spoken name request may be still directed to one of the properly working NUs that is able to fulfill the spoken name request. Or, a failed NU could direct the request to another NU in the system. Accordingly, to a technician performing a manual test, that voice mail system would appear to be working properly although there would be several components of the system that have, in fact, failed.

By way of illustration, if an operator tries to manually test a voice mail system 120, 130 on an inter-messaging network 110 by calling a voice mailbox and witnessing that a spoken name announcement is not heard over the telephone line in 3 to 5 seconds, the operator will not know if the spoken name was only slightly delayed or never received at all. However, with the NDD system and method, a technician is better able to diagnose the problem in an inter-messaging network 110, since more information is obtained about how the network is performing.

It should be emphasized that the above-described embodiments of the present invention, particularly, any "preferred" embodiments, are merely possible examples of implementations, merely set forth for a clear understanding of the principles of the invention. For example, it may be preferable that each network interface sub-system in the inter-messaging system may include the network diagnostic process. In this way, a technician can log onto any network interface sub-system that operates the NDD 150 to run a diagnostic check of the inter-messaging network 110. Further, it is contemplated that the network diagnostic device may be employed for other messaging formats and technologies besides voice mail, such as e-mail and fax, for example.

Accordingly, many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for checking the performance of an inter-messaging network, the inter-messaging network featuring a plurality of voice mail systems, each voice mail system being serviced by redundant network interface subsystems that respond to voice mail requests, the system comprising:

a diagnostic device connected to the inter-messaging network, the diagnostic device configured to request a data file from every redundant network interface subsystem on a voice mail system on the inter-messaging network, a network interface subsystem configured to service a request from remote voice mail system for a data file within a local voice mail system, wherein the diagnostic device is configured to check if a redundant network interface sub-system is responsive to network communications before generating the request and compile results indicating which of the redundant network interface sub-systems failed to provide the requested data file and which of the redundant network interface sub-systems succeeded in providing the requested data file.

2. The system of claim 1, wherein the diagnostic device is configured to query each redundant network interface sub-system of each voice mail system in the inter-messaging network to retrieve a test data file from a designated location in the respective voice mail system.

3. The system of claim 1, wherein the data file comprises a spoken name data file.

4. The system of claim 3, wherein the results further indicate an amount of failures from spokes name queries that were unable to be processed by respective network interface sub-systems.

5. The system of claim 3, wherein the result further include a breakdown of delays incurred in retrieving the spoken name data files.

6. The system of claim 3, wherein the results further include a breakdown of delays incurred retrievals of spoken name data files that occurred under a set time.

7. The system of claim 1, wherein the diagnostic device is located within a network hosting a voice mail system.

8. The system of claim 1, wherein the diagnostic device is located within a network that does not host a voice mail system.

9. The system of claim 1, where the voice mail system is structured such that an individual request for the data file may be directed to any of a plurality of network interface sub-systems that are servicing the voice mail system.

10. The system of claim 1, wherein the voice mail system is structured such that an individual request for the data file may be directed to a virtual address of network interface sub-system servicing the voice mail system, the virtual address being mapped to a physical address of an active network interface sub-system for the voice mail system, where a backup network interface sub-system is used if the active network interface sub-system fails.

11. The system of claim 1, wherein the test data file is a voice message for a mailbox on the voice mail system.

12. The system of claim 1, further comprising:
a directory server that receives a request from the diagnostic device to retrieve the test data file.

13. A system for checking the performance of an inter-messaging network, the inter-messaging network featuring a plurality of voice mail systems, each voice mail system being serviced by redundant network interface sub-systems that respond to voice mail requests, the system comprising:
means for establishing a connection to the inter-messaging network;
means for requesting a data file from every redundant network interface sub-system on a voice mail system on the inter-messaging network, a network interface sub-system system configured to service a request from a remote voice mail system for a data file within a local voice mail system;
means for checking if a redundant network interface sub-system is responsive to network communications before generating the request; and
means for compiling results indicating which of the redundant network interface sub-systems failed to provide the requested data file and which of the redundant network interface sub-systems succeeded in providing the requested data file.

14. The system of claim 13, further comprising:
means for identifying the plurality of redundant network interface sub-systems from an input data file.

15. The system of claim 13, wherein the result includes the amount of time that elapsed before the request attempt was completed.

16. The system of claim 13, further comprising:
means for verifying that said each one of the plurality of sub-systems is responsive to network communication before requesting the test data file.

17. The system of claim 13, wherein the test data file is retrieved from a default mailbox for said each one of the plurality of network interface sub-systems.

18. The system of claim 1, wherein the default mailbox is identified from the input data file.

19. The system of claim 17, wherein said each one of the plurality of network interface sub-systems and the default mailbox for said each one are located in one voice mail platform system.

20. The system of claim 13, wherein the test data file is a spoken name.

21. The system of claim 13, wherein the test data file is a voice message.

22. The system of claim 13, further comprising:
means for recording the result in a second output file if the result does not satisfy a desired level of performance for the inter-messaging network.

23. The system of claim 13, further comprising:
means for compiling the result for said each one of the plurality of network interface sub-systems into a summary of results for said each one of the plurality of network interface sub-systems into a summary of results for the inter-messaging network.

24. An apparatus for checking the performance of an inter-messaging network, the inter-messaging network featuring a plurality of voice mail systems, each voice mail system being serviced by redundant network interface sub-system that responds to voice mail requests, the apparatus comprising:
an interface adapted to connect to the inter-messaging network; and
logic configured to:
request a data file from every redundant network interface sub-system on a voice mail system on the inter-messaging network, a network interface sub-system configured to service a request from a remote voice mail system for a data file within a local voice mail system;
check if a redundant network interface sub-system is responsive to network communications before generating the request; and
compile results indicating which of the redundant network interface sub-systems failed to provide the requested data file and which of the redundant network interface sub-systems succeeded in providing the requested data file.

25. The apparatus of claim 24, the logic further configured to identify the plurality of network interface sun-systems from an input data file.

26. The apparatus of claim 24, the logic further configured to verify that said each one of plurality of sub-systems is responsive to network communication before requesting the test data file.

27. The apparatus of claim 24, wherein the test data file is retrieved from a default mailbox for said each one of the plurality of network interface sub-systems.

28. The apparatus of claim 27, wherein the default mailbox is identified from the input data file.

29. The apparatus of claim 24, wherein the test data file is a spoken name.

30. The apparatus of claim 24, wherein the test data file is a voice message.

31. A method for checking the performance of an inter-messaging network, the inter-messaging network featuring a plurality of voice mail systems, each voice mail system being serviced by redundant network interface sub-systems that respond to voice mail requests, the method comprising:

establishing a connection to the inter-messaging network;

requesting a data file from every redundant network interface sub-system on a voice mail system on the inter-messaging network, a network interface sub-system configured to service a request from a remote voice mail system for a data file within a local voice mail system;

checking if a redundant network interface sub-system is responsive to network communications before generating the request; and compiling results indicating which of the redundant network interface subsystems failed to provide the requested data file and which of the redundant network interface sub-systems succeeded in providing the requested data file.

32. The method of claim 31, further comprising:

identifying the plurality of network interface sub-systems from an input data file.

33. The method of claim 31, wherein the result includes the amount of time that elapsed before a request attempt was completed.

34. The method of claim 31, wherein requesting a data file comprises:

verifying that a particular sub-system of said each one of the plurality of network interface sub-systems is responsive to network communications; and after verifying said particular sub-system is responsive to network communications, requesting the test data file from said particular sub-system.

35. The method of claim 31, wherein the test data file is retrieved from a default mailbox for said each one of the plurality of network interface sub-systems.

36. The method of claim 35, wherein the default mailbox is identified from the input data file.

37. The method of claim 31, wherein the test data file is a spoken name.

38. The method of claim 31, wherein the test data file is a voice message.

39. The method of claim 31, wherein the result is recorded in a first output file.

40. The method of claim 31, wherein the result is recorded in a first output file.

41. The method of claim 40, further comprising:

recording the result in a second output file if the result does not satisfy a desired level of performance for the inter-messaging network.

42. The method of claim 31, further comprising:

compiling a summary of results for the inter-messaging network based upon the result produced for said each one.

43. A computer readable medium having a computer program stored therein for checking the performance of an inter-messaging network, the inter-messaging network featuring a plurality of voice mail systems, each voice mail system being serviced by redundant network interface sub-systems that respond to voice mail requests, wherein the program causes a computer to perform:

establishing a connection to the inter-messaging network;

requesting a data file from every redundant network interface sub-system on a voice mail system on the inter-messaging network, a network interface sub-system configured to service request from a remote voice mail system for a data file within a local voice mail system;

checking if a redundant network interface sub-system is responsive to network communications before generating the request; and compiling results indicating which of the redundant network interface sub-systems failed to provide that requested data file and which of the redundant network interface sub-systems succeeded in providing the requested file, wherein the result are displayed to a user.

44. The medium of claim 43, the program further comprising:

identifying the plurality of sub-systems from an input data file.

45. The medium of claim 43 wherein the result includes the amount of time that elapsed before a request was completed.

46. The medium of claim 43, the program further comprising:

verifying that a particular sub-system of said each one of the plurality of network interface sub-systems is responsive to network communications; and after verifying said particular sub-system is responsive to network communications, requesting the test data file from said particular sub-system.

47. The medium of claim 46, wherein the particular sub-system is verified by pinging the voice mail system.

48. The medium of claim 43, wherein the test data file is retrieved from a default mailbox for said each one of the plurality of network interface sub-systems.

49. The medium of claim 48, wherein the default mailbox is identified from the input data file.

50. The medium of claim 49, wherein said each one of the plurality network interface sub-systems and the default mailbox for said each one are located in one voice mail platform system.

51. The medium of claim 43, wherein the test data file is a spoken name.

52. The medium of claim 43, wherein the test data file is a voice message.

53. The medium of claim 43, wherein the request attempt is performed under Lightweight Directory Access Protocol.

54. The medium of claim 43, wherein the result is recorded in a first output file.

55. The medium claim 54, the program further comprising:

recording the result in a second output file if the result does not satisfy a desired level of performance for the inter-messaging network.

56. The medium of claim 43, the program further comprising:

compiling each said result for said sub-system into a summary of results for the inter-messaging network.

* * * * *

UNITED STATES PATENT AND TRADEMARK OFFICE
CERTIFICATE OF CORRECTION

PATENT NO. : 7,263,176 B2
APPLICATION NO. : 10/611206
DATED : August 28, 2007
INVENTOR(S) : John E. Cline et al.

Page 1 of 1

It is certified that error appears in the above-identified patent and that said Letters Patent is hereby corrected as shown below:

Col. 1, lines 10-11, after "filed under Express Mail No. EV269334009US", insert --and having serial number 10/611,205--.

Col. 1, lines 14-15, after "filed under Express Mail No. EV269333992US", insert --and having serial number 10/611,773--.

Signed and Sealed this

Twenty-fifth Day of March, 2008

JON W. DUDAS
*Director of the United States Patent and Trademark Office*